United States Patent Office 3,157,517
Patented Nov. 17, 1964

3,157,517
FATTY MATERIALS STABILIZED WITH
THIODIALKANOIC POLYESTERS
Clarence E. Tholstrup, Alan Bell, and Charles J. Kibler, Kingsport, Tenn., assignors to Eastman Kodak Company, Rochester, N.Y., a corporation of New Jersey
No Drawing. Filed Dec. 23, 1960, Ser. No. 77,862
24 Claims. (Cl. 99—163)

This invention relates to antioxidant compositions and to oxidizable materials stabilized therewith. It is particularly concerned with antioxidants comprising complex polyesters. The invention also relates to compositions of matter containing such antioxidants alone or in conjunction with certain phenolic antioxidants, and to the method of incorporating these antioxidants in said compositions.

Many organic materials, especially paraffin waxes, lard, and the like are normally subject to the deleterious effects of oxidation upon storage.

Sulfur-containing polyester compounds are known to be useful as lubricants, either alone or as constituents of grease compositions. Phenolic antioxidants are also known. Surprisingly, however, we have succeeded in preparing certain specific new complex polyesters which are useful both as antioxidants in normally oxidizable fatty organic materials and as plasticizers. Moreover, we have found that these new complex polyesters, particularly when used together with phenolic antioxidants, are effective as stabilizers in such fatty organic materials, in fact, cause a cumulative or synergistic antioxidant effect which is substantially more than the sum of the antioxidant effect of each when used separately. The formula for these complex polyesters is given below.

It is accordingly an object of this invention to provide a new class of antioxidants. See continuation-in-part Serial No. 309,339, filed September 16, 1963, as regards these new antioxidants per se. Also see Tholstrup, Kibler and Bell Serial No. 309,309, filed September 16, 1963, as regards hydrocarbon compositions containing these new antioxidants.

It is a further object of this invention to provide compositions of matter comprising a normally oxidizable fatty organic material stabilized with at least one member of the new class of antioxidants provided by this invention.

It is a further object to provide a method for stabilizing a normally oxidizable fatty organic material which comprises incorporating therein ae least one member of the new class of antioxidants provided by this invention.

It is also an object of this invention to provide novel fatty organic compositions containing synergistic antioxidant combinations of new complex polyesters and phenolic antioxidants.

Other objects will be apparent from the description and claims which follow.

According to a principal embodiment of this invention, there is provided a composition of matter comprising a normally oxidizable fatty organic material stabilized with a novel complex polyester having one of the following formulas:

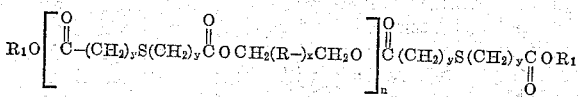

and

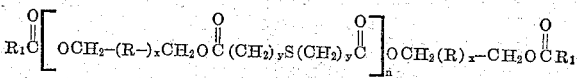

wherein $n$ is an integer from 1 to 20, $R_1$ is selected from the group consisting of a hydrogen atom, alkyl, cycloalkyl, and aryl radicals, R is selected from the group consisting of methylene, oxydimethylene, thiodimethylene, cycloalkyl, and aryl radicals, $x$ is an integer from 0 to 10, and $y$ is either 2 or 3. One feature of the above formula is the unobvious limitation of the $y$ to 2 or 3. We are unable to explain why the antioxidant effect will not take place satisfactorily when $y$ is less than 2 or greater than 3 or when a hydrocarbon radical containing a neopentyl group is substituted for the $(CH_2)_y$ group.

According to another embodiment of this invention, the normally oxidizable fatty organic material contains a stabilizer combination of a complex polyester of the above formula and a phenolic antioxidant. By normally oxidizable fatty organic material we mean any carbon-containing organic material which is ordinarily subject to oxidative deterioration, for example lard, vegetable oils, vitamins, waxes, and the like. By phenolic antioxidant we mean any organic phenol which exhibits antioxidant properties when compatible with and incorporated in a normally oxidizable material.

Thus, a wide variety of phenolic antioxidants can be effectively utilized in combination with the above-mentioned complex polyesters. Illustrative of such phenolic antioxidants are certain alkylidenebisphenols, such as those described in the copending Tholstrup application, Serial No. 4,189, filed January 25, 1960, now U.S. Patent 3,033,814, granted May 8, 1962. A particularly effective group of alkylidenebisphenols has the following formula:

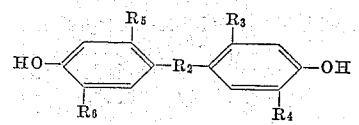

wherein $R_2$ is an alkylene or alkylidene radical having 1 to 12 carbon atoms, and wherein $R_3$, $R_4$, $R_5$ and $R_6$ are hydrocarbon radicals having 1 to 12 carbon atoms including benzyl radicals, cyclohexyl radicals, 1-alkylbenzyl radicals, 1-alkylcyclohexyl radicals, or more usually alkyl radicals having 1 to 12 and preferably 1 to 4 carbon atoms. $R_4$ and $R_6$ are desirably tertiary alkyl radicals having 4 to 8 carbon atoms. Another group of phenolic antioxidants also described in said copending Tholstrup application, Serial No. 4,189, consists of phenylsalicylates which have the formula

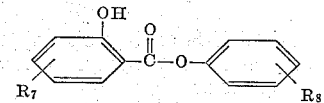

wherein $R_7$ and $R_8$ are hydrogen atoms or hydrocarbon radicals having 1 to 15 carbon atoms including benzyl radicals, cyclohexyl radicals,1-alkylbenzyl radicals, 1-alkylcyclohexyl radicals, or more usually alkyl radicals having 1 to 15 carbon atoms. Suitable substituted phenyl salicylates such as those described in the copending application by Addelburg, Lappin and Rouse, Serial No. 775,336, filed November 21, 1958, can also be utilized, said Addelburg et al. application now being U.S. Patent 3,043,797, granted July 10, 1962.

Another variety of phenolic antioxidants which are suitable for use in this invention are alkylenebisphenols and alkylidenebisphenols such as those described in copending application Serial No. 850,985 by Joyner et al., and having the general formulas

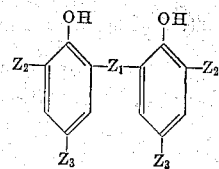

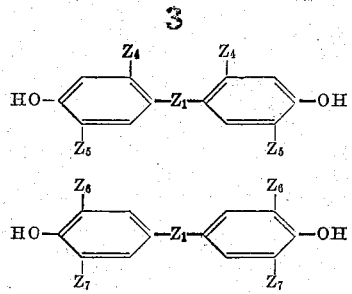

In the above bisphenol formulas: $Z_1$ is either an alkylidene radical or an alylene radical usually having 1 to 12 carbon atoms and more generally 1 to 4 carbon atoms and typically having the formulas

or $-(CH_2)_n-$ wherein Z is a hydrogen atom or an alkyl radical and $n$ is an integer of at least 1; and $Z_2$, $Z_3$, $Z_4$, $Z_5$, $Z_6$ and $Z_7$ are hydrogen atoms, alkyl radicals usually having 1 to 12 carbon atoms and preferably 1 to 4 carbon atoms, 1-alkylcyclohexyl radicals wherein the alkyl moiety usually has 1 to 4 carbon atoms, 1-alkylcyclohexyl radicals wherein the alkyl moiety usually has 1 to 4 carbon atoms and preferably is methyl, or 1-alkylbenzyl wherein the alkyl moiety usually has 1 to 4 carbon atoms and preferably is methyl. At least one of $Z_2$ and $Z_3$, at least one of $Z_4$ and $Z_5$, and at least one of $Z_6$ and $Z_7$ are other than hydrogen atoms in the preceding bisphenol formulas. Typical of these disphenols are 2,2'-alkylene or alkylidene bis (4 and/or 6-substituted phenols) such as 2,2'-methylenebis(4-methyl-6-tert.-butylphenol),
2,2'-methylenebis(4-tert.-dodecyl-6-methylphenol),
2,2'-methylenebis(4-methyl-6-tert.-dodecylphenol),
2,2'-methylenebis(6-tert.-butylphenol),
2,2'-methylenebis(4-tert.-dodecyl-6-methylphenol),
2,2'-methylenebis(4-tert.-dodecylphenol),
2,2'-methylenebis(4-methyl-6-amylphenol),
2,2'-methylenebis[4-methyl-6-(1-methylbenzyl)phenol],
2,2'-methylenebis[4-methyl-6-(1-methylcyclohexyl)phenol],
2,2'-ethylidenebis(4,6-diamylphenol),
2,2'-ethylidenebis(4-tert.-butyl-6-tert.-octylphenol),
2,2'-isopropylidenebis(4-tert.-butyl-6-n-dodecylphenol),
2,2'-isopropylidenebis(4,6-di-n-octylphenol),
2,2'-n-butylidenebis(4-methylphenol),
2,2'-n-butylidenebis[4-methyl-6-(1-methylbenzyl)phenol],
2,2'-isobutylidenebis[6-(1-n-butylcyclohexyl)phenol],
2,2'-n-dodecamethylenebis(4-tert.-butyl-6-methylphenol),
and related 2,2'-alkylene or
alkylidenebis(4 and/or 6-substituted phenols),
4,4'-alkylidene or alkylenebis(3 and/or 6-substituted phenols)
such as 4,4'-methylenebis(3-methyl-6-tert.-butylphenol),
4,4'-methylenebis(3-ethyl-6-tert.-dodecylphenol),
4,4'-methylenebis(6-tert.-butylphenol),
4,4'-methylenebis(3-tert.-dodecyl-6-methylphenol),
4,4'-methylenebis(3,6-ditert.-dodecylphenol),
4,4'-methylenebis(3-methylphenol),
4,4'-methylenebis[3-methyl-6-(1-ethylbenzyl)phenol],
4,4'-methylenebis[3-methyl-6-(1-iso-butylcyclohexyl)phenol],
4,4'-methylenebis[3-methyl-6-(1-methylbenzyl)phenol],
4,4'-ethylidenebis(3,6-diamylphenol),
4,4'-ethylidenebis(3-tert.-butyl-6-tert.-octylphenol),
4,4'-isopropylidenebis(3-tert.-butyl-6-6-n-dodecylphenol),
4,4'-isopropylidenebis(3,6-di-n-octylphenol),
4,4'-n-butylidenebis(3-methylphenol),
4,4'-n-butylidenebis(3-methyl-6-tert.-butylphenol),
4,4'-n-butylidenebis[3-methyl-6-(1-methylcyclohexyl)phenol],
4,4'-n-butylidenebis[3-methyl-6-(1-tert.-butylbenzyl)phenol],
4,4'-isobutylidenebis(3,6-di-n-octylphenol),
4,4'-isobutylidenebis 6-(1-n-butylcyclohexyl)phenol,
4,4'-n-decamethylenebis(3-methylphenol),
4,4'-n-dodecamethylenebis(3-tert.-butyl-6-methylphenol),
and related 4,4'-alkylene or
alkylidenebis(3 and/or 6-substituted phenols),
4,4'-alkylidene or
alkylenebis(2 and/or 6-substituted phenols) such as
4,4'-methylenebis(2-methyl-6-tert.-butylphenol),
4,4'-methylenebis(2-ethyl-6-tert.-octylphenol),
4,4'-methylenebis(2-methyl-6-tert.-dodecylphenol),
4,4'-methylenebis(6-methylphenol),
4,4'-methylenebis(2-tert.-dodecyl-6-methylphenol),
4,4'-methylenebis(2,6-di-tert.-dodecylphenol),
4,4'-methylenebis(2-methylphenol),
4,4'-methylenebis[2-methyl-6-(1-ethylbenzyl)phenol],
4,4'-methylenebis 2-methyl-6-(1-iso-butylcyclohexyl) phenol,
4,4'-methylenebis[2-methyl-6-(1-methylbenzyl)phenol],
4,4'-ethylidenebis(2,6-di-tert.-butylphenol),
4,4'-isopropylidenebis(2-tert.-butyl-6-n-dodecylphenol),
4,4'-isopropylidenebis(2-tert.-butyl-6-n-dodecylphenol),
4,4'-isopropylidenebis(2,6-di-n-octylphenol),
4,4'-n-butylidenebis(2-methylphenol),
4,4'-n-butylidenebis(2-methyl-6-tert.-butylphenol),
4,4'-n-butylidenebis[2-methyl-6-(1-methylcyclohexyl)phenol],
4,4'-n-butylidenebis[2-methyl-6-(1-tert.-butylbenzyl)phenol],
4,4'-isobutylidenebis(2,6-n-octylphenol),
4,4'-isobutylidenebis[6-(1-n-butylcyclohexyl)phenol],
4,4'-n-decamethylenebis(2-methylphenol),
4,4'-n-dodecamethylenebis(2-tert.-butyl-6-methylphenol),
and related 4,4'-alkylenebis(2 and/or 6-substituted phenols).

Among other representative phenolic antioxidants which may be used are single ring phenols and substituted phenols such as those described in copending Tholstrup application U.S. Serial No. 54, filed January 4, 1960, having the formulas

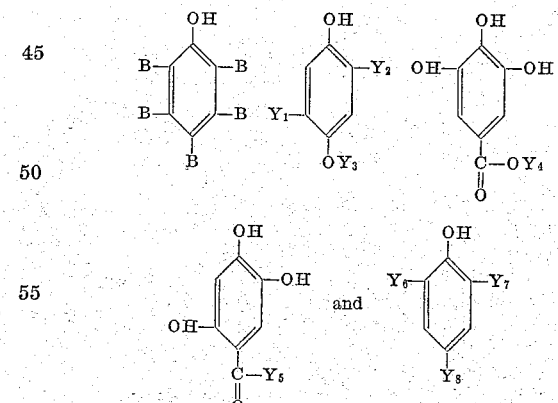

wherein B can be H or OH, but OH is no more than two of the B positions, $Y_3$, $Y_4$ and $Y_5$ are alkyl radicals desirably having 1 to 18 carbon atoms and preferably 1 to 12 carbon atoms; $Y_1$, $Y_2$, $Y_6$, $Y_7$ and $Y_8$ are alkyl radicals desirably having 1 to 18 carbon atoms and preferably 1 to 12 carbon atoms, hydrogen atoms, or cyclic hydrocarbon radicals desirably having 6 carbon atoms in the cyclic nucleus and preferably 1-alkylcyclohexyl radicals or 1-alkylbenzyl radicals with the alkyl radical having desirably 1 to 18 and preferably 1 to 12 carbon atoms, and wherein at least one of $Y_1$ and $Y_2$ is other than a hydrogen atom and at least two of $Y_6$, $Y_7$ and $Y_8$ are other than hydrogen atoms. The substituent $Y_2$ and at least one of $Y_6$ and $Y_7$ is preferably a tertiary alkyl radical having 4 to 8 carbon atoms, a 1-methylbenzyl radical or a 1-methylcyclohexyl radical. Typical of these substituted phenols are 2-tert-butyl-4-methoxyphenol,
3-tert.-butyl-4-methoxyphenol,
3-tert.-octyl-4-methoxyphenol,
2-methyl-4-methoxyphenol,
2-stearyl-4-n-butoxyphenol,
3-tert.-butyl-4-stearyloxyphenol,
3-tert.-octyl-4-methoxyphenol,
3-lauryl-4-ethoxyphenol,
2,5-di-tert.-butyl-4-methoxyphenol,
2-methyl-4-methoxyphenol,
2-(1-methylcyclohexyl)-4-methoxyphenol,
2-tert.-butyl-4-dodecyloxyphenol,
2-(1-methylbenzyl)-4-methoxyphenol,
2-tert.-octyl-4-methoxyphenol,
methyl gallate,
n-propyl gallate,
n-butyl gallate,
lauryl gallate,
myristyl gallate,
stearyl gallate,
2,4,5-trihydroxyacetophenone,
2,4,5-trihydroxy-n-butyrophenone,
2,4,5-trihydroxystearophenone,
2,6-di-tert.-butyl-4-methylphenol,
2,6-di-tert.-octyl-4-methylphenol,
2,6-di-tert.-butyl-4-stearylphenol,
2-methyl-4-methyl-6-tert.-butylphenol,
2,6-distearyl-4-methylphenol,
2,6-diluaryl-4-methylphenol,
2,6-di(1-methylbenzyl)-4-methylphenol,
2,6-di(1-methylcyclohexyl)-4-methylphenol,
2-(1-methylcyclohexyl)-4-methylphenol,
2-(1-methylbenzyl)-4-methylphenol,
and related substituted phenols.

Other phenolic antioxidants which can be used in our invention are the 4,4'-alkylenedioxybis(alkylated phenols) such as those described in copending application U.S. Serial No. 702,814 by Bell, Knowles, and Tholstrup (now U.S. Patent 2,967,774, granted January 10, 1961), which have the formula

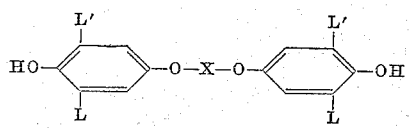

wherein each of L and L' represents a member selected from the group consisting of a hydrogen atom and an alkyl-organic radical containing from 1 to 12 carbon atoms, said alkyl-organic radical encompassing members selected from the group consisting of alkyl, cycloalkyl, alkenyl, and aralkyl radicals, and X represents an alkylene radical containing from 1 to 10 carbon atoms. L' above can be the same as L or it can be a different alkyl-organic radical or a hydrogen atom. Each of the four substituents represented by L and L' can be different although it is generally advantageous if the two L substituents are identical and the two L' substitutens be the same as the two L substituents or that they represent hydrogen atoms.

Equally as suitable for the purposes of this invention as the phenolic antioxidants already recited are certain thiobisphenols having the following general formulas:

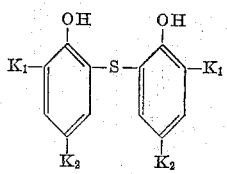

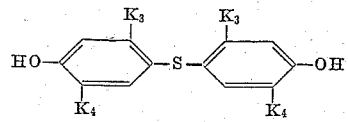

and

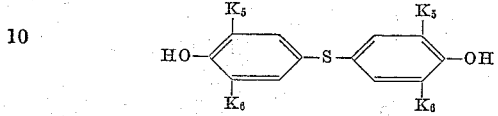

These thiobisphenols are more particularly described in copending Tholstrup application, U.S. Serial No. 860,667, filed December 26, 1959. In the above thiobisphenol formulas: $K_1$, $K_2$, $K_3$, $K_4$, $K_5$ and $K_6$ can be hydrogen atoms, alkyl radicals, or a cyclic hydrocarbon radical, and at least one of such radicals or substituents on each phenol nucleus is preferably other than a hydrogen atom. The alkyl radicals desirably have 1 to 18 carbon atoms, and preferably 1 to 12 carbon atoms. $K_1$, $K_4$ and $K_5$ are preferably tertiary alkyl radicals having 4 to 8 carbon atoms such as tertiary butyl radicals and tertiary octyl radicals, or 1-methylcyclohexyl radicals. The cyclic hydrocarbon radicals desirably have 6-carbon cyclic nuclei such as cyclohexyl and benzyl, and preferably are such radicals as 1-methylcyclohexyl and 1-methylbenzyl. Especially useful thiobisphenols in the invention are 2,2'-thiobis(4 - methyl - 6 - tert.-butylphenol), 4,4'-thiobis(3-methyl-6-tert.-butylphenol), 4,4' - thiobis[3-methyl-6-(1-methylcyclohexyl)phenol] and 4,4'-thiobis(2-methyl-6-tert.-butylphenol). Other typical thiobisphenols which can be used include 2,2'-thiobis(4,6-dimethylphenol),
2,2'-thiobis(4,6-di-tert.-butylphenol),
2,2'-thiobis(4-ethyl-6-tert.-butylphenol),
2,2'-thiobis(4-n-propyl-6-amylphenol),
2,2'-thiobis(4-methyl-6-n-octylphenol),
2,2'-thiobis(4-amyl-6-tert.-octylphenol),
2,2'-thiobis(4-methyl-6-n-decylphenol),
2,2'-thiobis(4-methyl-6-laurylphenol),
2,2'-thiobis[4-methyl-6-(1-methylcyclohexyl)phenol],
2,2'-thiobis[4-methyl-6-(1-methylbenzyl)phenol],
2,2'-thiobis(4-methylphenol),
2,2'-thiobis(6-tert.-butylphenol),
2,2'-thiobis(4,6-dilaurylphenol),
2,2'-thiobis(4,6-distearylphenol),
4,4'-thiobis(3,6-dimethylphenol),
4,4'-thiobis(3,6-di-tert.-butylphenol),
4,4'-thiobis(3-ethyl-6-tert.-butylphenol),
4,4'-thiobis(3-n-propyl-6-amylphenol),
4,4'-thiobis(3-methyl-6-n-octylphenol),
4,4'-thiobis(3-amyl-6-tert.-octylphenol),
4,4'-thiobis(3-methyl-6-n-decylphenol),
4,4'-thiobis(3-methyl-6-laurylphenol),
4,4'-thiobis(3,6-dilaurylphenol),
4,4'-thiobis(3,6-distearylphenol),
4,4'-thiobis[3-methyl-6-(1-methylcyclohexyl)phenol],
4,4'-thiobis[3-methyl-6-(1-methylbenzyl) phenol],
4,4'-thiobis(2-tert.-butylphenol),
4,4'-thiobis[2-methyl-6-(1-methylcyclohexyl)phenol],
4,4'-thiobis[2-methyl-6-(1-methylbenzyl)phenol],
4,4'-thiobis(2-methyl-6-tert.-butylphenol),
4,4'-thiobis(2-tert.-butylphenol),
4,4'-thiobis(2-methyl-6-laurylphenol),
4,4'-thiobis(2,6-distearylphenol), and related thiobisphenols.

In addition to monomeric phenols, a wide variety of polymeric phenols and polyphenols come within the scope of the phenolic antioxidants defined above and can also be effectively utilized in combination with the complex polyesters referred to hereinabove. Illustrative of such polymeric phenols are those described in copending Tholstrup application, U.S. Serial No. 5,377, filed January 29, 1960, having the general formula:

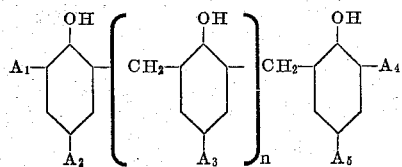

wherein $A_1$, $A_2$, $A_3$, $A_4$, and $A_5$ are alkyl radicals usually having 1 to 12 carbon atoms and preferably 1 to 4 carbon atoms, and $n$ is an integer of 1 to 4 and preferably 1 to 2. $A_1$ and $A_4$ are preferably tertiary alkyl radicals such as tertiary butyl radicals. Other suitable substituents for $A_1$, $A_2$, $A_3$, $A_4$ and $A_5$ include methyl, ethyl, isopropyl, n-butyl, amyl, octyl, decyl, lauryl, stearyl, and related alkyl radicals. Typical of such polymeric phenols and polyphenols and 4-methyl-$\alpha,\alpha'$-bis(3-tert.-butyl-5-methyl-2-hydroxyphenol)-2,6-xylenol and $\alpha^2,\alpha^{2'}$-methylenebis(2-hydroxy-5-methyl-m-phenylene) bis(6-tert.-butyl-2,4-xylenol). Such compounds can be prepared by the method described in Angewandte Chemie, vol. 70, pp. 390–8, July 7, 1958.

Other phenolic antioxidants which can be used effectively in this invention are a wide variety of hydroxyl-containing amines as illustrated by those having the formulas:

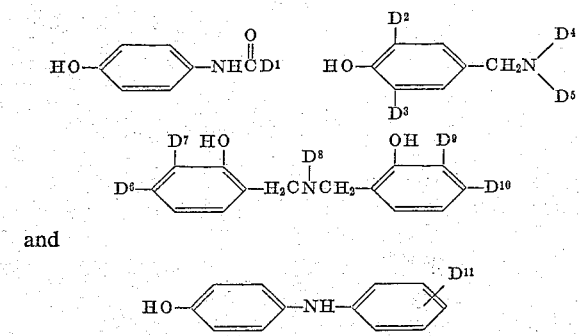

and wherein $D^1$, $D^2$, $D^3$, $D^4$, $D^5$, $D^6$, $D^7$, $D^8$, $D^9$, and $D^{10}$ are alkyl radicals having 1 to 18 carbon atoms, and preferably 1 to 12 carbon atoms; and wherein $D^{11}$ is an alkyl radical or an alkoxy radical, both having 1 to 18 carbon atoms, and preferably 1 to 12 carbon atoms.

Typical of these hydroxyl-containing amines are 4-hydroxy-4'-methoxydiphenylamine,
4-hydroxy-4'-isobutoxydiphenylamine,
4-hydroxy-4'-n-octyldiphenylamine,
3-tert.-butyl-4'-hydroxydiphenylamine,
4-hydroxy-4'-lauryldiphenylamine,
2-tert.-butyl-4'-hydroxydiphenylamine,
4-hydroxy-4'-stearyldiphenylamine,
3-stearyl-4'-hydroxydiphenylamine,
2,6-di-tert.-butyl-p-dimethylaminomethylphenol,
2,6-dimethyl-p-distearylaminomethylphenol,
2,6-di-tert.-octyl-p-dilaurylaminomethylphenol,
2,6-distearyl-p-dimethylaminomethylphenol,
2,6-dilauryl-p-diethylaminomethylphenol,
N,N'-bis(2-hydroxy-3-tert.-butyl-5-methylbenzyl)methylamine,
N,N'-bis(2-hydroxy-3-tert.-butyl-5-laurylbenzyl)laurylamine,
N,N'-bis(2-hydroxy-3-lauryl-5-stearylbenzyl)-n-butylamine,
N,N'-bis(2-hydroxy-3-methyl-5-tert.-butylbenzyl)stearylamine,
N-acetyl-p-aminophenol,
N-n-butyryl-p-aminophenol,
N-caprylyl-p-aminophenol,
N-pelargonyl-p-aminophenol,
N-myristoyl-p-aminophenol,
N-lauroyl-p-aminophenol,
N-palmitoyl-p-aminophenol,
N-n-nonadecanoyl-p-aminophenol, and related hydroxyl-containing amines.

Thus, the group of phenolic antioxidants which can be used in this invention in synergistic combination with certain complex polyesters to be more particularly defined hereinbelow includes alkylene bisphenols, alkylidene bisphenols, single-ring phenols and substituted single-ring phenols, phenyl salicylates and substituted phenyl salicylates, thiobisphenols, 4,4'-alkylenedioxybis(alkylated phenols), polymeric phenols or polyphenols, and hydroxyl-containing amines, and the like, the most preferable compounds from this group being those enumerated hereinabove.

The novel complex polyesters of this invention are characterized by a lower molecular weight than that of the so-called polythioesters. For best results the molecular weight should be no greater than about 2,000. The complex polyesters can be prepared by reacting 3,3'-thiodipropionic or 4,4'-thiodibutyric acid or an ester of either of these two with glycols. Suitable glycols that can be employed in the preparation of the polyesters include ethylene glycol, 1,3-propylene glycol, 1,4-butanediol, 1,5-pentanediol, 1,6-hexanediol, neopentyl glycol, 2,2-diethyl propanediol-1,3, 2-ethyl-2-butylpropanediol-1,3, 2-ethyl-2-propylpropanediol-1,3, 2-ethyl-2-methylpropanediol-1,3, 2,2,4-trimethylhexanediol-1,6, 1,10-decanediol, 1,2-$\alpha,\alpha'$-xylenediol, diethyleneglycol, triethyleneglycol, $\beta,\beta'$-thiodiethanol, 1,3-$\alpha,\alpha'$-xylenediol, 1,4-$\alpha,\alpha'$-xylenediol, 1,1-cyclohexanedimethanol, 1,2-cyclohexanedimethanol, 1,3-cyclohexanedimethanol, 1,4-cyclohexanedimethanol, and the like. Of these, the preferred glycols to be used in our invention are neopentyl glycol, ethylene glycol, 1,4-cyclohexanedimethanol, diethylene glycol, 1,4-butanediol, $\beta,\beta'$-thiodiethanol, and 1,5-pentanediol. When it is desired to make esters conforming to the formula first above-mentioned, $n+1$ moles of the acid or ester can be reacted with $n$ moles of the glycol using any of the other interchange catalysts known to the art. When compounds corresponding to the second formula given above are desired, $n$ moles of the acid or ester can be reacted with $n+1$ moles of the glycol. However, the ratios of reactants can be altered to produce compounds of various molecular weights. To produce the novel low molecular weight complex polyesters of the invention, an appropriate chain-terminating agent may be used, for example, a monobasic carboxylic acid, its ester or anhydride, or a monohydric alcohol or substituted alcohol. Examples of alcohols which may be so used are methanol, ethanol, butanol, isobutanol, 2-ethylhexanol, 2,2-dimethylpentanol, and 2,2,4-trimethylpentanol. Examples of acids which can be used in a similar manner as acids or in their anhydride form are acetic acid, butyric acid, isobutyric acid, lauric acid, oleic acid, stearic acid, pelargonic acid and benzoic acid. Although in many cases it may be preferable to terminate the polyesters of this invention with monofunctional alcohols or acids, the unterminated polyesters are also useful and are within the scope of this invention. Complex polyesters of the proper molecular weight are obtained by varying the conditions of the reaction and the amounts of the reactants as is more specifically illustrated by the examples given hereinafter. The preferred molecular weight ranges from about 500 to about 2,000.

Specific materials which can be stabilized with the antioxidants of this invention include fatty oils and fats such as lard, waxes, cottonseed oil, corn oil, peanut oil and citrus oils, fatty acids, glycerides, vitamin compositions and the like.

The amount of antioxidant which can be employed in practicing this invention varies depending upon the material being stabilized, the degree of stabilization desired, the presence or absence of other stabilizing materials such as the phenolic antioxidants which we have found to be particularly effective when used together with our complex polyesters, and similar varying features. In most cases, the stabilizers can be advantageously employed in concentrations of from about 0.01% to about 2% by weight based on the total weight of the composition being stabilized. However, the antioxidants of the invention can also be employed in amounts of from about 0.001% to about 5% by weight. Moreover, larger or smaller quantities can also be employed. Where the polyesters are used together with phenolic antioxidants, concentrations of from about 0.001% to about 5% of each additive are preferred, although larger or smaller quantities of each are permissible. In addition, the antioxidants of this invention can be employed in conjunction with other antioxidants known to be useful for the stabilization of compositions normally subject to oxidative deterioration. When using a combination of the polyester and a phenolic antioxidant, we generally utilize the combination at a weight ratio of the complex polyester to the phenolic antioxidant in the range of 1/20 to 20/1 and preferably 1/5 to 5/1. When required, deactivators and other additives can be included.

The polyesters of this invention, alone or in synergistic combination with the phenolic antioxidants already referred to or other antioxidants can be advantageously employed as added components used in the preparation of edible materials such as cooking oils and fried food prepared using such cooking oils. Similarly, such antioxidant compositions can be used in preparing wrappers for foods and other materials subject to oxidative deterioration. Moreover, antioxidant compositions incorporating the compounds of this invention can be incorporated into coating materials such as paraffin wax or hydrocarbon oils used for the preparation of waxed paper and other wrapping materials whereby foods contained therein are protected against oxidative deterioration.

The preparation of typical compounds and compositions embodying this invention is illustrated by the following examples. Others which come within the scope of the invention can be prepared in a similar manner, and it is not intended that the invention should be limited to these specific compounds and compositions set forth in the following examples which are provided for purposes of illustration.

*Example 1.—Preparation of Polyester of 3,3'-Thiodiprionic Acid and Neopentyl Glycol, Molecular Weight 669*

A mixture of 267 g. (1.5 moles) of 3,3'-thiodipropionic acid, 96.7 g. (0.93 mole) of neopentyl glycol and 201 g. (1.73 moles) of 2,2-dimethylpentanol containing 0.4 ml. of titanium tetraisopropoxide was placed in a two-liter, three-necked flask. The flask was fitted with a stirrer and a two-foot packed column terminating in a vacuum still head and receiver. The mixture was heated with stirring under the conditions given in the following table:

| Time, Hr. | Temp., °C. | Pressure, mm. Hg | Water Collected, ml. | Acid No. |
|---|---|---|---|---|
| 8 | 124-150 | 200 | 38 | |
| 14 | 150-170 | 200-95 | 53.5 | 3.30 |
| 38 | 170 | 95 | 55 (3 moles) | 0.28 |
| 66 | 170 | 82 | | 0.25 |
| 90 | 170 | 1.0 | | |

As water was formed, it was removed by distillation and collected in the receiver. After the acid number had reached 0.25, the column was removed, the pressure was dropped to 1 mm., and the excess 2,2-dimethylpentanol and any other volatiles were removed by distillation.

The light colored liquid was cooled, and 5 g. of a diatomaceous silica filter aid and 50 ml. of water were added. This was refluxed for 3 hours with stirring to convert the titanium alkoxide catalyst to inert $TiO_2$. The mixture was filtered by suction to remove the $TiO_2$ and filter aid and the filtrate dried at 110° C. under vacuum. The polyester had a molecular weight of 669, determined by the boiling point elevation in benzene.

*Example 2.—Preparation of Polyester of 3,3'-Thiodipionic Acid and Neopentyl Glycol, Molecular Weight 1,106*

A polyester was prepared by the procedure of Example 1 above except that the ratios of reactants were altered to permit the formation of a product of higher molecular weight. 267 g. (1.5 moles) of 3,3'-thiodipropionic acid, 125 g. (1.2 moles) of neopentyl glycol and 139 g. (1.2 moles) of 2,2-dimethylpentanol were used. The molecular weight of the liquid polyester was 1,106.

*Example 3.—Preparation of Polyester of 3,3'-Thiodipionic Acid and Neopentyl Glycol, Molecular Weight 1,445*

A polyester was prepared in accordance with Example 1 with the exception that the proportions of the reactants were altered to obtain a product of a still higher molecular weight. 1.5 moles of 3,3'-thiodipropionic acid, 1.5 moles of neopentyl glycol, and 0.6 mole of 2,2-dimethylpentanol were used. The viscous liquid produced had a molecular weight of 1,445.

*Example 4.—Preparation of Polyester of 3,3'-Thiodipionic Acid and Ethylene Glycol, Molecular Weight 571*

A polyester was prepared by the procedure of Example 1 except that ethylene glycol and butanol were used in place of the neopentyl glycol and 2,2-dimethylpentanol. The product had a molecular weight of 571.

*Example 5.—Preparation of Polyester of 3,3'-Thiodipionic Acid and 1,5-Pentanediol, Molecular Weight 674*

A polyester was prepared by the procedure of Example 1 from 1.5 moles of 3,3'-thiodipropionic acid, 0.93 mole of 1,5-pentanediol, and 1.7 moles of hexanol. The product was semi-solid and had a molecular weight of 674.

*Example 6.—Preparation of Polyester of 4,4'-Thiodibutyric Acid and Ethylene Glycol, Molecular Weight 670*

A polyester was prepared according to the procedure given in Example 1 with the exception that 4,4'-thiodibutyric acid, ethylene glycol, and 2-ethylhexanol were used. The resulting complex polyester was a light yellow liquid having a molecular weight of 670.

*Example 7.—Preparation of Polyester of 4,4'-Thiodibutyric Acid and Ethylene Glycol, Molecular Weight 1,200*

The procedure of Example 1 was followed with the exception that the reactants used were 4,4'-thiodibutyric acid, ethylene glycol, and acetic acid. The molecular weight of the ester produced was approximately 1,200.

The following example, Example 8, illustrates the preparation of a polyester of thiodipivalic acid and neopentyl glycol not coming within the scope of the compounds of this invention but to be used for comparative purposes in tables included hereinafter to illustrate the lack of stabilizing effect of such a polyester when used in fatty materials as contrasted with the stabilizing effect of the polyesters of this invention.

*Example 8.—Preparation of Polyester of Thiodipivalic Acid and Neopentyl Glycol, Molecular Weight 811*

A polyester was prepared in accordance with the procedure of Example 1 with the exception that an equivalent amount of thiodipivalic acid was used in place of the 3,3'-thiodipropionic acid. The resulting product was a light yellow colored liquid, which had a molecular weight of 811.

*Example 9.—Preparation of Polyester of 3,3'-Thiodipionic Acid and 1,4-Cyclohexanedimethanol, Molecular Weight 767*

A polyester was prepared by the procedure of Example 1 except the 267 g. (1.5 moles) of thiodipropionic acid, 134 g. (0.93 mole) of 1,4-cyclohexanedimethanol and 225 g. (1.73 moles) of 2-ethylhexanol were used.

In this case 4.0 ml. of a 10% solution of $Mg[HTi(OR)_6]_2$ (R butyl) in butanol were used as catalyst. The product was a clear yellow viscous oil of molecular weight 767. It had an acid number of 0.10 and a hydroxyl number of 1.13.

*Example 10.—Preparation of Polyester of 3,3'-Thiodipropionic Acid and Diethylene Glycol, Molecular Weight 893*

A polyester was prepared by the procedure of Example 1 except that 249 g. (1.4 moles) of thiodipropionic acid, 106 g. (1.0 mole) of diethylene glycol, and 195 g. (1.5 moles) of 2-ethylhexanol were used. The viscous yellow product had a molecular weight of 893.

*Example 11.—Preparation of Polyester of 3,3'-Thiodipropionic Acid and β,β'-Thiodiethanol, Molecular Weight 773*

A polyester was prepared by the procedure of Example 1 above except that 249 g. (1.4 moles) of thiodipropionic acid, 106 g. (0.87 mole) of β,β'-thiodiethanol and 195 g. (1.5 moles) of 2-ethylhexanol were used. The viscous yellow oil had a molecular weight of 773. The acid number was 0.13 and the hydroxyl number was 2.00.

*Example 12.—Preparation of Polyester of 3,3'-Thiodipropionic Acid and Ethylene Glycol, Molecular Weight 1,441 (Not Terminated)*

A polyester was prepared by the procedure of Example 1 using 267 g. (1.5 moles) of thiodipropionic acid and 124 g. (2.0 moles) of ethylene glycol and 0.4 ml. of titanium isopropoxide. After 16 hours heating at 140–160° C., 78 ml. of distillate (water and ethylene glycol) were collected. The pressure was reduced to 1 mm. of mercury, and excess glycol was stripped at 120–140° C. for 6.5 hr. Then 2 g. of filter aid and 10 ml. of $H_2O$ were added to the light yellow oil, and it was heated to 100° C. for 10 min. and filtered through a heated Büchner funnel. The product had a molecular weight of 1,441. The acid number was 45.25, and the hydroxyl number was 25.25.

Other compounds coming within the scope of the general formulas set forth above can be prepared in a manner similar to that illustrated by the preceding specific examples. Some of these additional compounds are named in the tables provided hereinbelow. Many other polyesters not prepared in the preceding examples will be readily apparent to those skilled in the art.

Examples illustrating the effectiveness of the polyesters of this invention as antioxidants, when used alone or in synergistic relationship with phenolic antioxidants, are set forth in the following tables. The antioxidants can be incorporated into the material to be stabilized by any suitable means, including simply mixing the constituents. Another method comprises dissolving the antioxidant in a solvent which is miscible with the material to be stabilized and then mixing the solution of the antioxidant with the material to be stabilized. Various other methods for incorporating the antioxidant into the materials to be stabilized will be readily apparent.

In the following tables stability was determined in accordance with the Active Oxygen Method, according to which method air was bubbled through the material to be tested containing the antioxidant at the temperature indicated and the oxidation was followed by determination of the milliequivalents of peroxide formed per kilogram of substrate. The results are indicated in terms of number of hours required to reach a Peroxide Value (PV) of 20 milliequivalents. The complex polyesters may be incorporated in any commercially available lard or other fatty material with a comparable degree of antioxidant effect. In the following tables percent figures refer to percent by weight of the oxidizable materials in which the fats are used. Where used, BHA refers to butylated hydroxy anisole.

Tables I and III illustrate the effectiveness of certain of the complex polyesters when used alone in lard. Table II includes samples wherein polyesters of thiodipivalic acid were used for the purpose of contrasting the lack of antioxidant ability of such a polyester with the surprising antioxidant effect of the polyesters of this invention.

Table III demonstrates the synergistic, or more than cumulative, effect when representative polyesters of this invention are used with typical phenolic antioxidants in samples from a separate batch of lard. Included in Table III, again for purposes of contrasting the effectiveness of polyesters of this invention with the lack of antioxidant ability of polyesters made from other thiodiacids, is a polyester of thiodipivalic acid.

Table IV shows the stabilization of lard with additional polyesters of this invention.

TABLE I

| Additives in Lard | 100° C., AOM Value (hours) | |
|---|---|---|
| | Lard Sample A | Lard Sample B |
| Control (Lard with no additive) | 13 | 7 |
| 0.02% Polyester of Example 4 | | 69 |
| 0.02% Polyester of Example 1 | | 33 |
| 0.02% Polyester of Example 3 | | 42 |
| 0.02% Acetylated Polypentamethylenethiodipropionate | 100 | |
| 0.02% Butylated Polypentamethylenethiodipropionate | 94 | |
| 0.02% Dilauryl-3,3'-thiodipropionate | 30 | 19 |

TABLE II

| Additives in Paraffin Wax | Percent | AOM Value at 150° C., Hr. to 20 meq. Peroxides |
|---|---|---|
| Control | 0 | 4 |
| Polyester of Example 9 | 0.01 | 13 |
| Polyester of Example 11 | 0.01 | 13 |
| Polyester of Example 12 | 0.01 | 11 |
| Polyester of Example 10 | 0.01 | 11 |
| Polyester of Example 8 (Thiodipivalic Acid Polyester.) | 0.01 | 3 |

TABLE III

| Additives in Lard | 100°C., AOM Value, Hours |
|---|---|
| Control | 7 |
| 0.01% Polyester of Example 4 | 10 |
| 0.01% Polyester of Example 1 | 8 |
| 0.01% Polyester of Example 3 | 7 |
| 0.01% Polyester (Thiodipivalic Acid Polyester) | 6 |
| 0.01% BHA | 52 |
| 0.01% BHA+0.01% Polyester of Example 4 | 58 |
| 0.01% BHA+0.01% Polyester of Example 1 | 58 |
| 0.01% BHA+0.01% Polyester of Example 3 | 57 |
| 0.01% BHA+0.01% Polyester of Example 8 (Thiodipivalic Acid Polyester.) | 48 |

TABLE IV.—STABILIZATION OF LARD

| Additives in Lard | Percent | AOM Value at 100° C., Hr. to 20 Meq. Peroxides |
|---|---|---|
| Control | 0 | 7 |
| Polyester of Example 9 | 0.02 | 30 |
| Polyester of Example 11 | 0.02 | 28 |
| Polyester of Example 10 | 0.02 | 29 |
| DLTDP (dilauryl 3,3'-thiodipropionate) | 0.02 | 19 |

The preceding examples set forth in the various tables illustrate that the complex polyesters of this invention are suitable both when used alone and when used in conjunction with phenolic antioxidants such as those referred to hereinabove for the stabilization of any of the fatty organic materials normally subject to oxidative deterioration. Data such as those presented above can be obtained regarding any of the fatty triglycerides, diglycerides, or monoglycerides using the same AOM procedure described above and employed to obtain results given in the illustrative examples.

This invention has been described in considerable detail with particular reference to certain preferred embodiments thereof. It will be understood, however, that variations and modifications can be effected without departing from the spirit and the scope of the invention as described hereinabove and as defined in the appended claims.

We claim:

1. A composition of matter consisting essentially of a normally oxidizable fatty organic edible material stabilized with from about 0.001% to about 5% by weight of said normally oxidizable fatty material of a complex polyester selected from the group consisting of compounds having the formulas

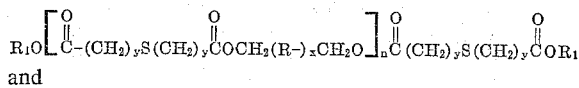
and
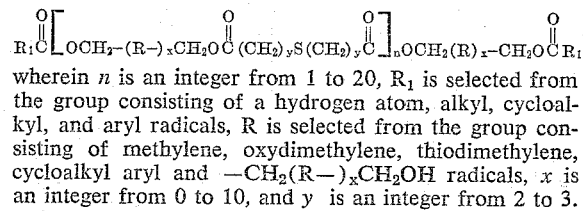

wherein $n$ is an integer from 1 to 20, $R_1$ is selected from the group consisting of a hydrogen atom, alkyl, cycloalkyl, and aryl radicals, R is selected from the group consisting of methylene, oxydimethylene, thiodimethylene, cycloalkyl aryl and $-CH_2(R-)_xCH_2OH$ radicals, $x$ is an integer from 0 to 10, and $y$ is an integer from 2 to 3.

2. A composition of matter as defined by claim 1 wherein said polyester has a molecular weight of from about 500 to about 2,000.

3. A composition of matter as defined by claim 2 wherein $R_1$ contains no more than about 18 carbon atoms.

4. A composition of matter as defined by claim 3 wherein $R_1$ is 2,2-dimethylpentyl in said first formula, $y$ is 2 and $x$ is 3 whereby $(R-)_x$ is 3:

5. A composition of matter as defined by claim 4 wherein said polyester has a molecular weight of about 669.

6. A composition of matter as defined by claim 4 wherein said polyester has a molecular weight of about 1,445.

7. A composition of matter as defined by claim 3 wherein $R_1$ is butyl in said first formula, $y$ is 2 and $x$ is 0.

8. A composition of matter as defined by claim 7 wherein said polyester has a molecular weight of about 571.

9. A composition of matter as defined by claim 3 wherein $R_1$ is 2-ethylhexyl in said first formula, $y$ is 2, $x$ is 1 and R is 1,4-cyclohexanedimethylene.

10. A composition of matter as defined by claim 9 wherein said polyester has a molecular weight of about 767.

11. A composition of matter as defined by claim 3 wherein $R_1$ is 2-ethylhexyl in said first formula, $y$ is 2, $x$ is 1 and R is oxydimethylene.

12. A composition of matter as defined by claim 11 wherein said polyester has a molecular weight of about 893.

13. A composition of matter as defined by claim 3 wherein $R_1$ is 2-ethylhexyl in said first formula, $y$ is 2, $x$ is 1 and R is thiodimethylene.

14. A composition of matter as defined by claim 13 wherein said polyester has a molecular weight of about 773.

15. A composition of matter as defined by claim 1 wherein said fatty material is lard.

16. A composition of matter as defined by claim 2 wherein said fatty material is lard.

17. A composition of matter as defined by claim 3 wherein said fatty material is lard.

18. A composition of matter as defined by claim 4 wherein said fatty material is lard.

19. A composition of matter as defined by claim 7 wherein said fatty material is lard.

20. A composition of matter as defined by claim 9 wherein said fatty material is lard.

21. A composition of matter as defined by claim 11 wherein said fatty material is lard.

22. A composition of matter as defined by claim 13 wherein said fatty material is lard.

23. A composition of matter as defined by claim 3 which has incorporated therein from about 0.001% to about 5% by weight of a phenolic antioxidant.

24. A composition of matter as defined by claim 23 wherein said phenolic antioxidant is butylated hydroxyanisole.

References Cited in the file of this patent
UNITED STATES PATENTS

| | | |
|---|---|---|
| 2,262,686 | Kyrides et al. | Nov. 11, 1941 |
| 2,462,633 | Gribbins | Feb. 22, 1949 |
| 2,563,835 | Gribbins et al. | Aug. 14, 1951 |
| 2,668,847 | Newton | Feb. 9, 1954 |
| 2,704,746 | Chenicek | Mar. 22, 1955 |
| 2,793,999 | Dietrich et al. | May 28, 1957 |
| 2,796,404 | Levin | June 18, 1957 |
| 2,893,197 | Morris et al. | Feb. 11, 1958 |

UNITED STATES PATENT OFFICE
CERTIFICATE OF CORRECTION

Patent No. 3,157,517                            November 17, 1964

Clarence E. Tholstrup et al.

It is hereby certified that error appears in the above numbered patent requiring correction and that the said Letters Patent should read as corrected below.

Column 13, line 28, strike out "and"; same line 28, after "aryl" insert -- and $-CH_2(R-)_x CH_2 OH$ --; line 30, after "cycloalkyl" insert -- and --; same line 30, strike out "and $-CH_2(R-)_x CH_2 OH$".

Signed and sealed this 1st day of June 1965.

(SEAL)
Attest:

ERNEST W. SWIDER                                       EDWARD J. BRENNER
Attesting Officer                                          Commissioner of Patents